(12) United States Patent
Luttrell et al.

(10) Patent No.: US 11,076,578 B2
(45) Date of Patent: Aug. 3, 2021

(54) TIME RELEASE APPLICATION AND MONITORING SYSTEM

(71) Applicants: Robert Shane Luttrell, Memphis, TN (US); Mason Kauffman, Memphis, TN (US); Steven Zatechka, Memphis, TN (US); Christopher Przybyszewski, Memphis, TN (US)

(72) Inventors: Robert Shane Luttrell, Memphis, TN (US); Mason Kauffman, Memphis, TN (US); Steven Zatechka, Memphis, TN (US); Christopher Przybyszewski, Memphis, TN (US)

(73) Assignee: US Biologic, Inc., Memphis, TN (US)

( * ) Notice: Subject to any disclaimer, the term of this patent is extended or adjusted under 35 U.S.C. 154(b) by 479 days.

(21) Appl. No.: 15/491,967

(22) Filed: Apr. 19, 2017

(65) Prior Publication Data

US 2018/0035638 A1 Feb. 8, 2018

Related U.S. Application Data

(60) Provisional application No. 62/324,812, filed on Apr. 19, 2016.

(51) Int. Cl.
*A01K 5/02* (2006.01)
*A01M 25/00* (2006.01)
*A01K 5/00* (2006.01)

(52) U.S. Cl.
CPC ............ *A01K 5/0291* (2013.01); *A01K 5/008* (2013.01); *A01K 5/0275* (2013.01); *A01M 25/002* (2013.01)

(58) Field of Classification Search
CPC .... A01K 5/0291; A01K 5/0275; A01K 5/008; A01K 97/02
USPC ......... 119/51.1, 51.11, 51.13, 53, 57.1, 57.5, 119/57.91, 57.92
See application file for complete search history.

(56) References Cited

U.S. PATENT DOCUMENTS

| 4,485,765 | A | * | 12/1984 | Schwartz | ............. | A01K 5/0291 |
| | | | | | | 119/51.13 |
| 4,981,106 | A | * | 1/1991 | Nagatomo | ........... | A01K 5/0275 |
| | | | | | | 119/51.11 |

(Continued)

*Primary Examiner* — Ebony E Evans
(74) *Attorney, Agent, or Firm* — William S. Parks; Susan B. Fentress

(57) ABSTRACT

Provided herein are mechanisms and methods for the automated distribution of active ingredients (whether oral or contact based) to wild and domestic animal populations as well as a method for monitoring animal activity and estimating consumption and/or application of such ingredients within the population through the utilization of the mechanisms themselves. The inventive device pertains to a manner of delivering either an active oral ingredient or active contact ingredient within a bait pellet or like substrate for ingestion or external contact and/or coating of a target population. The device allows for controlled access of such a bait pellet (or like substrate) for such a target population coupled with the ability to retain freshness thereof for multiple timed access events without the need for human involvement. A properly sized, configured, and automated delivery device is thus provided to meet these needs. Delivery components are also encompassed herein.

9 Claims, 9 Drawing Sheets

(56) References Cited

U.S. PATENT DOCUMENTS

| | | | | |
|---|---|---|---|---|
| 5,078,097 A * | 1/1992 | Chisholm | ............ | A01K 5/0291 |
| | | | | 119/51.11 |
| 5,176,103 A * | 1/1993 | Reid | .................... | A01K 5/0291 |
| | | | | 119/51.13 |
| 5,199,381 A * | 4/1993 | Masopust | .............. | A01K 61/85 |
| | | | | 119/51.04 |
| 7,204,054 B2 * | 4/2007 | Mayo | .................. | A01M 1/2005 |
| | | | | 222/85 |
| 8,490,324 B2 * | 7/2013 | Highet | ................ | A01M 25/004 |
| | | | | 43/131 |
| 8,544,412 B1 * | 10/2013 | Harverstock | ............ | A01K 5/00 |
| | | | | 119/61.54 |
| 8,683,738 B2 * | 4/2014 | Pryor | .................. | A01M 25/004 |
| | | | | 43/131 |
| 9,332,729 B1 * | 5/2016 | Hyle | ........................ | A01K 5/02 |
| 2005/0066905 A1 * | 3/2005 | Morosin | .............. | A01K 5/0291 |
| | | | | 119/51.02 |
| 2008/0104882 A1 * | 5/2008 | Bernard | ............... | A01M 1/2011 |
| | | | | 43/131 |
| 2008/0289580 A1 * | 11/2008 | Krishnamurthy | .... | A01K 5/0291 |
| | | | | 119/51.11 |
| 2011/0114025 A1 * | 5/2011 | McMurphy | .............. | A01K 5/00 |
| | | | | 119/51.5 |
| 2016/0007564 A1 * | 1/2016 | Ma | ....................... | A01K 5/0225 |
| | | | | 119/57.1 |
| 2017/0035025 A1 * | 2/2017 | Oates | ................... | A01K 5/0275 |
| 2017/0238503 A1 * | 8/2017 | Deritis | ................. | A01K 5/0275 |
| 2020/0367469 A1 * | 11/2020 | Zhu | ....................... | A01K 5/0225 |
| 2020/0396959 A1 * | 12/2020 | Bahr | .................... | A01K 5/0291 |

* cited by examiner

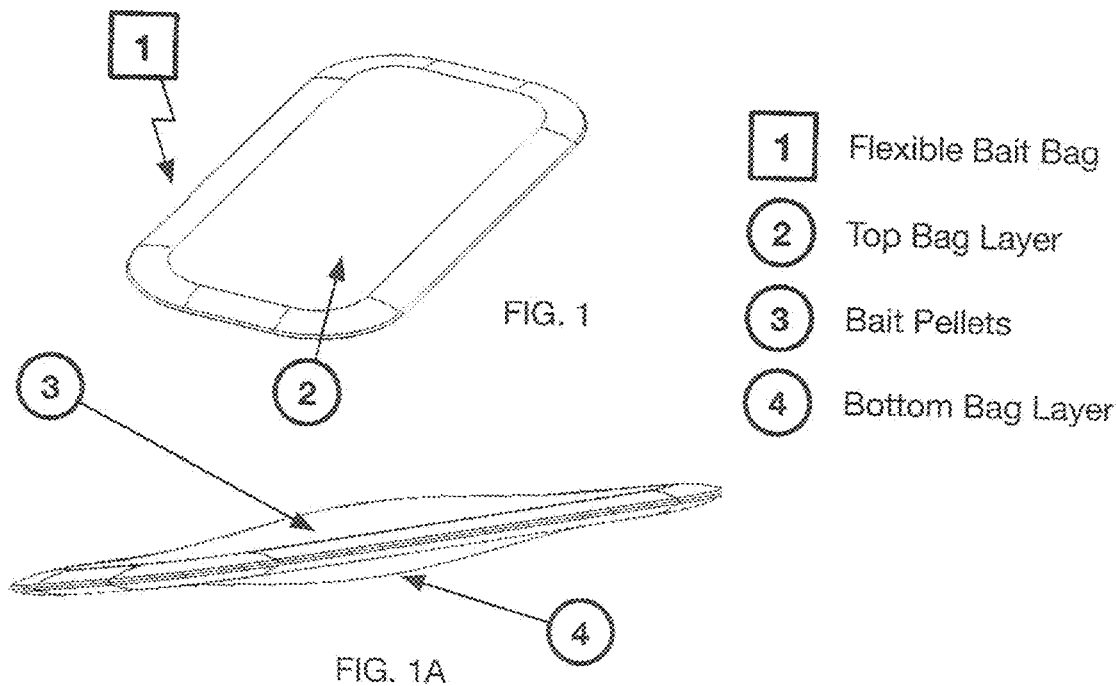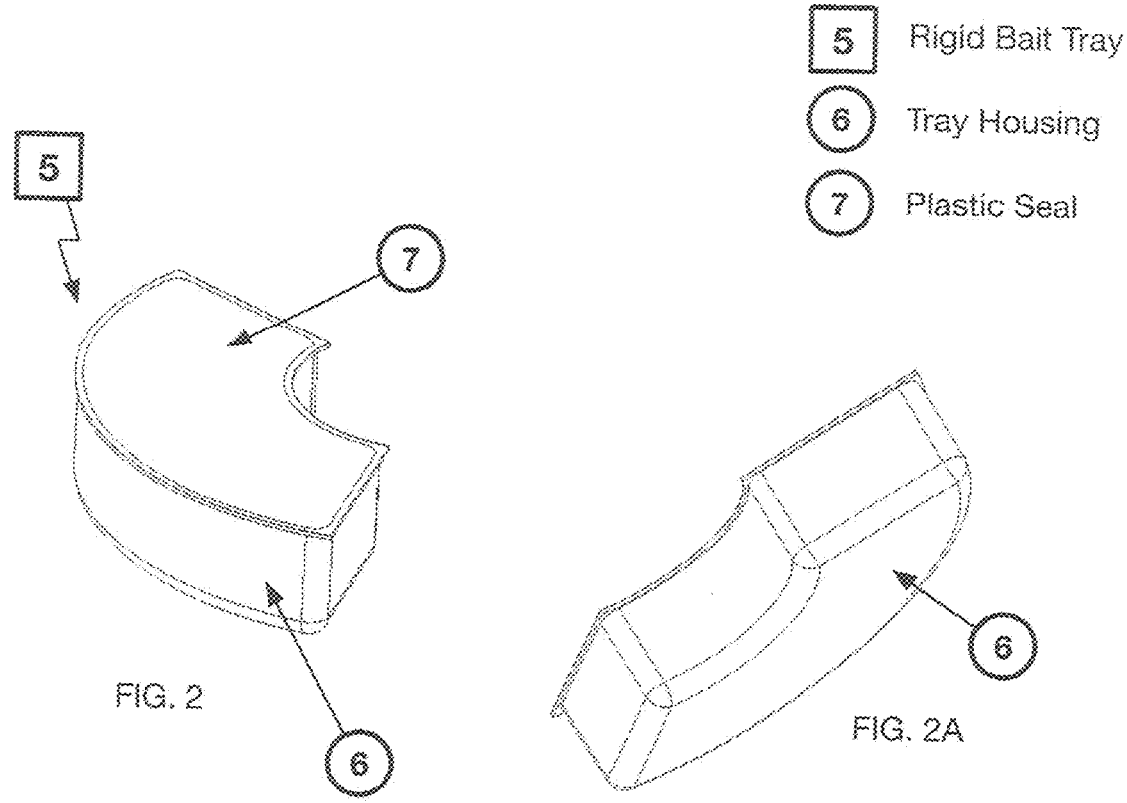

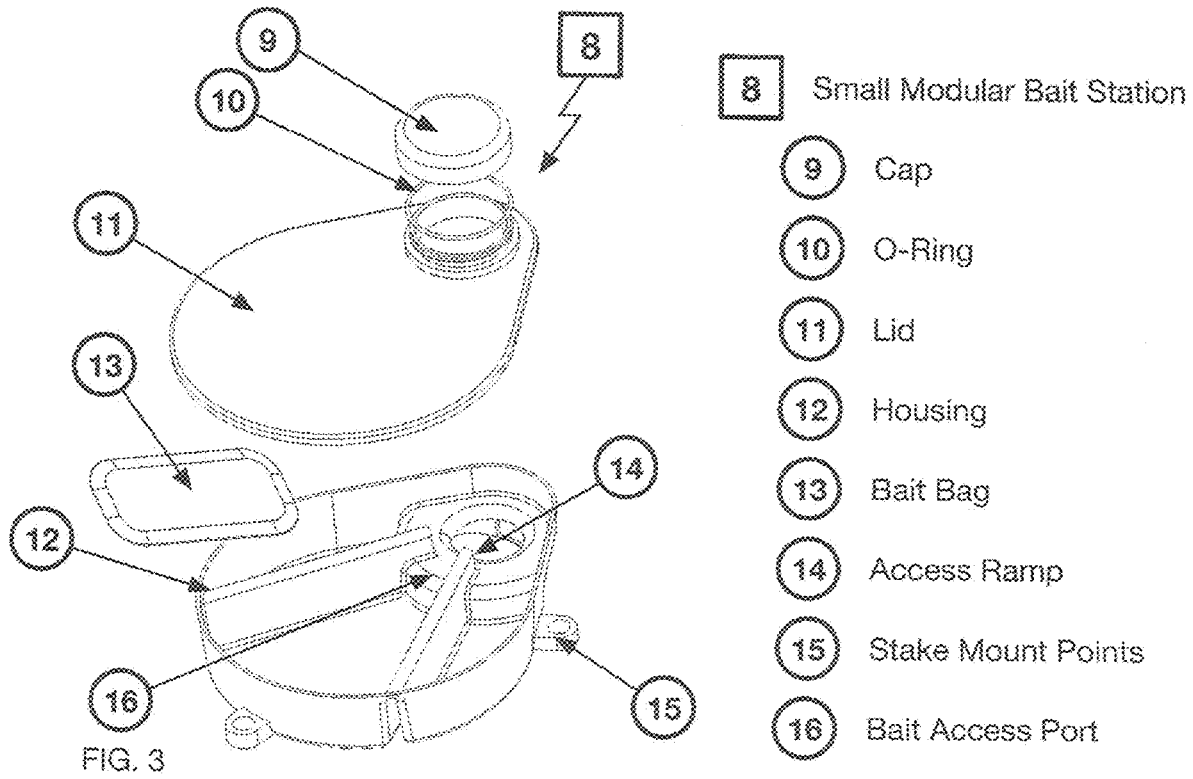
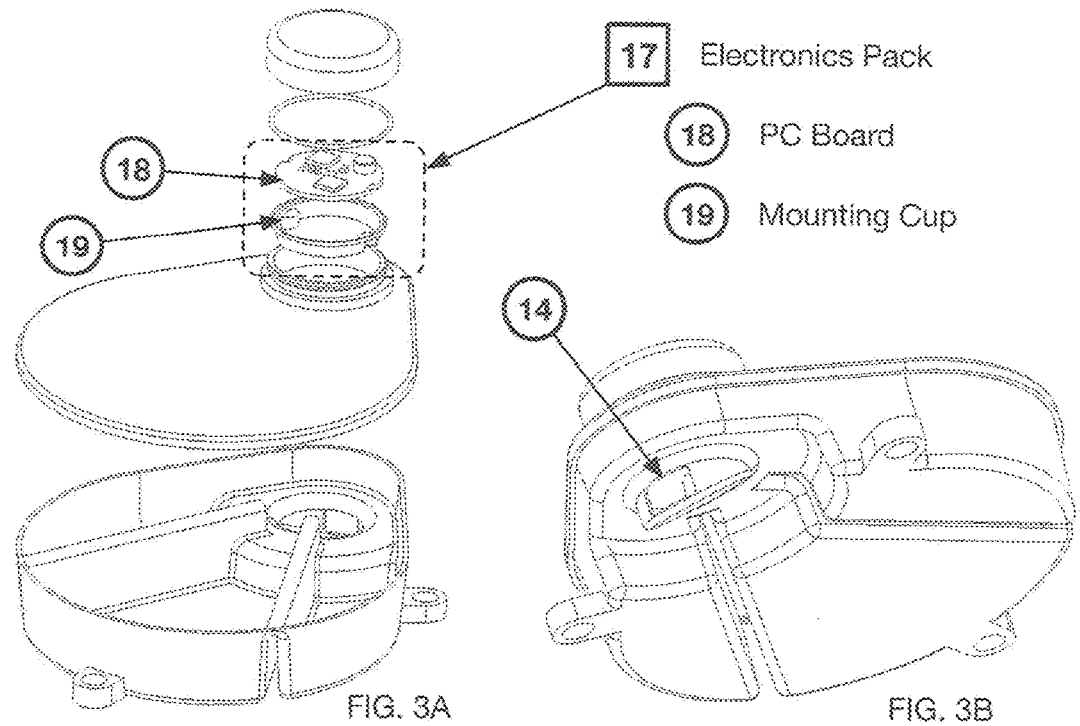

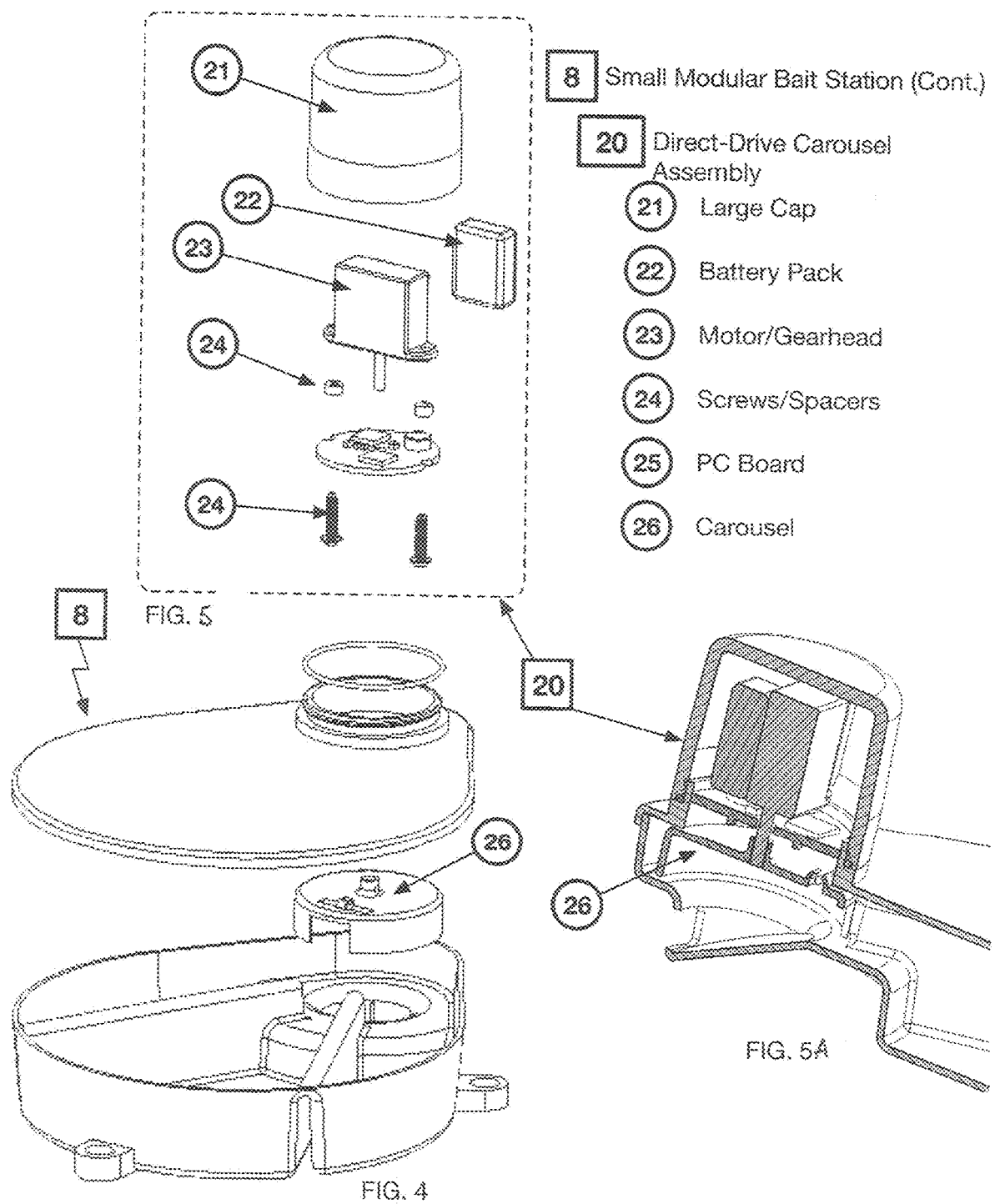

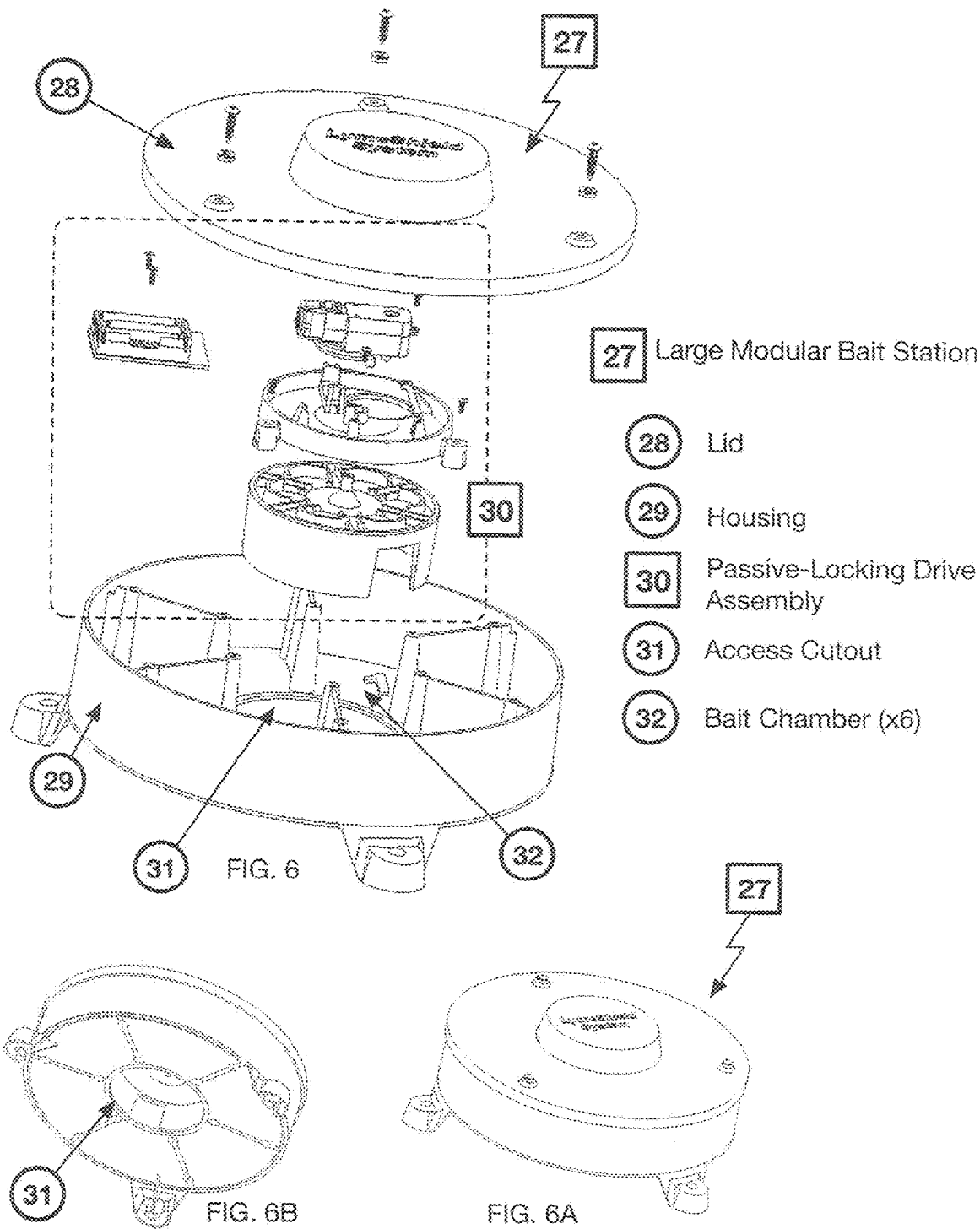

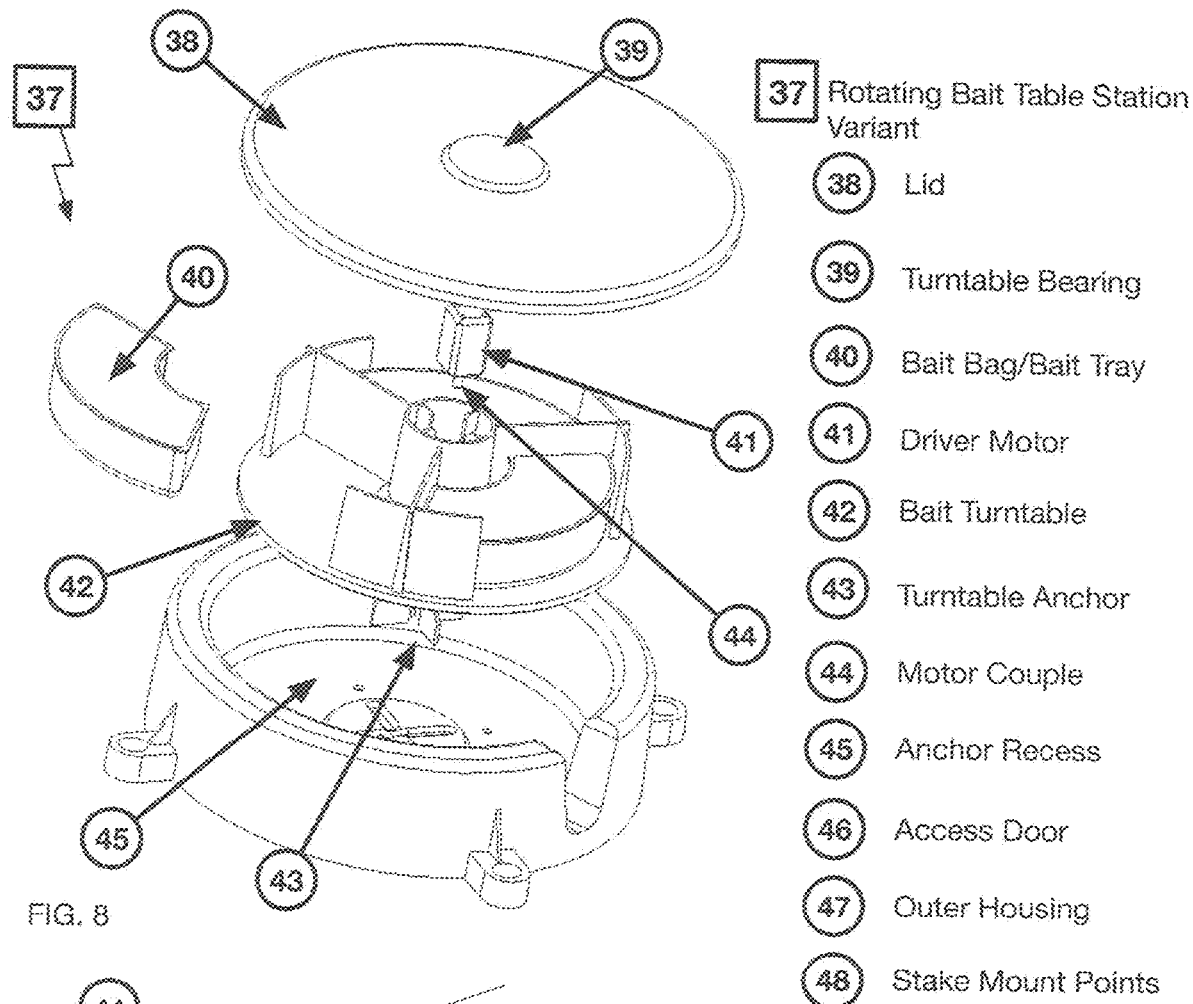
37 Rotating Bait Table Station Variant
- 38 Lid
- 39 Turntable Bearing
- 40 Bait Bag/Bait Tray
- 41 Driver Motor
- 42 Bait Turntable
- 43 Turntable Anchor
- 44 Motor Couple
- 45 Anchor Recess
- 46 Access Door
- 47 Outer Housing
- 48 Stake Mount Points
FIG. 8
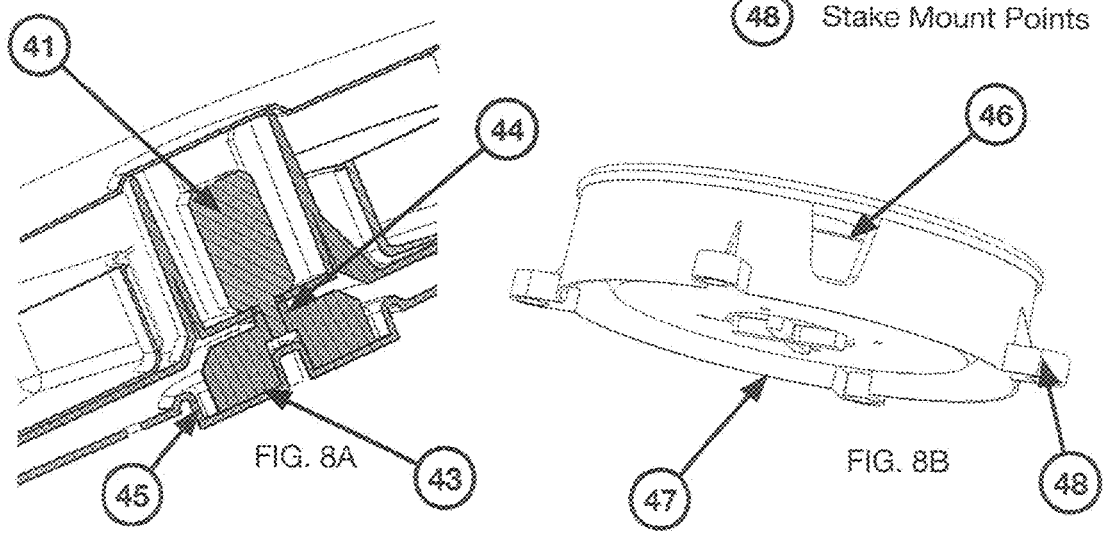
FIG. 8A
FIG. 8B

| 49 | Bucket/Paddle Hybrid Feeder |
| 50 | Lid |
| 51 | Housing |
| 52 | Feeder Subassembly |

| 52 | Feeder Subassembly |
| 53 | Spindle Subassembly |
| 54 | Flexible Blade |
| 55 | Rigid Bucket |
| 56 | PC Board |
| 57 | Motor |
| 58 | Feeder Chute |
| 59 | Shield |

- 62 PC Board
- 63 Straight TOF Sensor
- 64 Angled TOF Sensor
- 65 Animal
- 66 Floor or Access Ramp

TIME RELEASE APPLICATION AND MONITORING SYSTEM

CROSS-REFERENCE TO RELATED APPLICATION

This application claims priority to U.S. Provisional Patent Application No. 62/324,812, filed on Apr. 19, 2016. This application thus herein incorporates in its entirety said initial provisional application.

FIELD OF THE INVENTION

Provided herein are mechanisms and methods for the automated distribution of active ingredients (whether oral or contact based) to wild and domestic animal populations as well as a method for monitoring animal activity and estimating consumption and/or application of such ingredients within the population through the utilization of the mechanisms themselves. The inventive device pertains to a manner of delivering either an active oral ingredient or active contact ingredient within a bait pellet or like substrate for ingestion or external contact and/or coating of a target population. The device allows for controlled access of such a bait pellet (or like substrate) for such a target population coupled with the ability to retain freshness thereof for multiple timed access events without the need for human involvement. A properly sized, configured, and automated delivery device is thus provided to meet these needs. Delivery components are also encompassed herein.

BACKGROUND OF THE PRIOR ART

There is often a desire to distribute an accurately timed and/or dosed distribution of an active ingredient, either oral or contact, within a target animal population that is spread across a wide geographic range. There may also be a need to distribute this ingredient more than once in a single season. Previous work in this area includes the utilization of bait boxes. This rather simple method of distributing active ingredient is usually designed to kill the target population. As merely examples, products such as d-CON rodent control boxes, roach baits, ant baits, and the like, are designed to be used indoors or in protected areas and left until the bait has been eaten. These boxes offer no protection from weather and offer no control against non-target populations, such as pets, accidentally consuming the bait which may be toxic to such domesticated animals.

A more robust variant of the d-CON rodent bait box is the Protecta station. These types of stations are often locked plastic boxes suitable for outdoor use and are designed to physically restrict access to the bait, protecting pets and children. Variants of these designs allow live trapping of rodents as well as the application of insecticides onto the rodents.

Other prior distribution methods are known as broadcasters. In these devices, bait or feed may be grossly timed by manual distribution using vehicle rotary spreaders or aerial drops. Less widespread but better timed distributions may be made using centripetal feeders which typically have programmable feed rates and intervals. Intended for hunting or wildlife baiting, these designs are for attracting larger animals such as deer.

There are also other successful wildlife vaccine programs based upon a variation of the simple d-CON box in which a vaccine rather than lethal ingredient is added to the bait. For example, in the oral rabies vaccine (ORV) program, Raboral V-RG oral vaccine was mixed with fishmeal and packaged in small plastic film sachets to be eaten by raccoons. Distribution was by airplane and helicopter (as described within the ORV program described within the North Carolina public health system). Another program included a vaccine against bovine tuberculosis (bTB) and was distributed in molasses-based bait to deer by manual spreading (described within a University of Nebraska-Lincoln study, as an example).

Pest monitoring systems are known in the industry for methods that monitor general pest activity or trap state. While the vast numbers of these systems rely upon passive IR or beam-interrupt detection, some alternatives are mechanical switches, capacitive detection, or EM field manipulation. Most include a microprocessor to stamp and record the time of the event. These include, as examples, the collecting and monitoring of information from a plurality of monitoring locations. There is no provision, however, for switching between baits, nor storing more than one bait for later consumption in a specific timed/partitioned delivery procedure. There are also certain methods that utilize mechanical latches or photocell detection methods to determine the proximity of rodents to certain traps.

These prior methods, unfortunately, all suffer from certain disadvantages. Importantly, there are four primary requirements for a successful wildlife inoculation system:
1. Maximize the deployment life of the bait in the field. This is important both to maintain the effectiveness of the bait/AI and to extend the allowable time period to deploy the stations. Note that this requirement also includes the physical security of the station, as large animals should not be able to damage or destroy any housing containing the bait/AI.
2. Limit access to the target animal population as much as possible. In this way, the effectiveness of the bait/AI is maximized in the target species.
3. Provide target population access to bait across a large area. Note that this requirement implies either cost effective broadcast distribution, or a large number of low cost point sources for the bait/AI.
4. Time and dose the release of bait to correspond to the desired treatment window within the target species or population.

Simple box distribution methods, such as the d-CON system, only address requirement 3. Improved box systems such as Protecta can address all requirements except for 4; however, the timing and/or dosing of bait/AI release is absolutely necessary for many small animal inoculation programs (less so extermination). Commercial broadcasters can easily meet criterion for timed release and widespread coverage (given enough units), but have no ability to control what animal population actually consumes the bait. The ability of broadcasters to protect the bait/AI from the environment is also questionable. Most of the reviewed inoculation programs also focused on species (deer, raccoons) with significantly longer life spans than rodents such as field mice. As a result, vaccine needed only a single, continuous application over the year rather than a tranched seasonal application. Aerial distribution of packets and manually placed bait/AI can meet requirements 1 and 3, but can only roughly meet requirement 4 (depending on the size of the geographic area to be treated). Absolutely no provision is made to limit access to the bait to a specific species except selection of bait most appealing to that desired species.

Finally, there are some existing pest monitoring systems that may accomplish the goal of quantifying pest activity within a given area using technologies such as mechanical latch, beam breaking, or passive IR detection; however, no method was provided within the prior art using active IR proximity detection. Such IR proximity detection may allow for a range to the target to be discerned so that a single sensor may measure whether a target is entering or leaving the access corridor. Such a sensor may thus simplify the design of the electronics and packaging and thereby potentially facilitate utilization as well.

In any event, there remains a distinct need to provide all four of the noted requirements for controlled wildlife baiting with active ingredients (particularly, though not necessarily, oral programs). The present invention overcomes these prior deficiencies.

Advantages and Brief Description of the Invention

One advantage of the herein disclosed method and mechanical device of the invention is the ability to target specific animals for providing access to oral vaccine bait and/or external contact substances through a configuration and size combination. Another advantage is the ability to control dispensing of bait pellets and the like through access structures and compartments that are provided in relation to time periods. Yet another advantage is the ability to prevent unwanted intrusion within non-accessible compartments thereof through structural requirements therein. Still another advantage of the overall method and device system is the delivery of bait pellets and the like in timed intervals without the need for human involvement and/or compromising the effectiveness or freshness of the base delivery compositions or the vaccines included therein.

Accordingly, the overall method and device delivery system comprises automated feed delivery bait station device, said device comprising a housing having a top, bottom, and sides, wherein said top is a removable structure, said bottom includes an access port, and said sides are completely closed from ingress and egress, said housing further exhibiting a cavity formed by said top, bottom, and sides; at least one compartment present within said cavity for retaining said feed, said compartment including said housing bottom access port; a plurality of stakes extending from said bottom and said sides, wherein said stakes include connection means for staking said device into the ground for secure retention at such a location, wherein said stakes create a passageway therethrough and raise said housing such that said access port within said housing bottom does not contact said ground when said device is retained on said ground; and an electrical controller to activate movement associated with access port for the passage of feed therethrough when activated or the provision of an access point for animals to enter when activated. The device further may include components wherein said access port is configured to permit ingress and egress of animals upon activation of said electrical controller, the wherein said access port is configured to gravitationally allow passage of specific amounts of said feed in selected doses through said access port to said ground upon activation of said electrical controller, as well as, more particularly, wherein said base includes a plurality of compartments for feed retention and said access port allows entry therein to only one of said compartments for said animals at any one time.

The present invention utilizes an automated device with different available storage means for timed access to permit exposure to target rodents (or other animals). Such a device operates in two different manners, according the user the ability to deliver certain bait as needed to best ensure thorough exposure of a target small rodent population for vaccine or pesticide transfer. As an overall concept, then, is provided such an automated delivery method and system that allows for such bait delivery through location availability at different time periods without any need for human involvement for such delivery. Thus, in essence, such a method and/or system effectively substitutes for the simple delivery, by hand, of bait pellets within a certain locality, such as, for instance, a wooded area known to house small rodents that carry the pathogen or bacteria associated with tick- or other insect-borne diseases. The simple hand delivery method would lead, invariably, to such bait being ingested by other animals as there is a need for such bait to attract small rodents (field mice, voles, etc.) to ensure such ingestion and/or external contact occurs. Thus, leaving such bait in the open would not provide a reliable method of such treated bait delivery, primarily due to the inability to ensure the correct target population of small rodents actually ingests the seeded substances. As noted above, there are certain developments that attempt to overcome this deficiency, but, unfortunately, suffer serious drawbacks themselves. With the automated system and/or method now employed and described herein, numerous benefits are accorded the user to facilitate each of these underlying concerns.

Thus, the provision of a self-contained delivery and deployment device for these purposes overcomes such problems. Such a device includes at least one timed deployment component that permits either gravitational delivery of bait pellets (and the like) to an area that is accessible solely for small rodents or access through rotational movement of an ingress point that can only be reached and entered by such small rodents. Such delivery thus allows for both timed release of such bait pellets (and the like) and, perhaps more importantly, certain doses of bait with specific vaccine/coating, etc., amounts for targeted small rodent populations. Of importance, then, is the provision of a structure that can be reliably attached to and retained by the target ground on which the device is placed. To that end, the device will include legs that extend below the dispensing point and/or access point, wherein the legs are configured to block undesirable animal entry (e.g., are of a size and disposition to prevent raccoons, opossums, and the like from accessing the area underneath), but will permit smaller rodents (rats, field mice, voles, and the like) to reach such an area. The legs would thus be provided with ground contact points that include holes for attachment devices to pass through into the ground and/or piercing attachments or extensions that provide such a secure attachment result. In this manner, at the very least, the device as attached to the ground will not easily be overturned by a larger animal to allow access. This is important in order to avoid the need for human interaction and involvement as monitoring such a device repeatedly would reduce the efficiencies needed for overall effectiveness. Additionally, the ability to raise the height of the delivery/storage chamber(s) of the device allows for reduced chances of other unwanted problems, such as, for instance, insect invasion and flooding due to potential standing water. The potential for insect issues may be further alleviated with certain coatings and/or surface treatments of the legs and underside components of the device, as well. All in all, such a raised structure, with protective and secure leg components, allows for significant benefits that have heretofore not been investigated within this art.

The deployment/delivery portion of the device thus allows for different means to allow access to such bait pellets (and the like). The ability to provide a single, double, multiple, chambers that are accessible through the rotation of a ramp, door, opening, etc., is particularly valuable in this sense. The ability to provide such chambered storage compartments permits the necessary long-term (monthly, seasonal, etc.) capability of device placement and utilization in a desired location without human interaction and/or monitoring. The bait pellets (and the like) stored within such compartments are kept "fresh" for long periods of time until the device rotates for small rodent access to a different compartment (and thus new "fresh" supply of bait). Alternatively, a bucket deployment device may be utilized wherein the bait pellets (and the like) are stored within such a vessel until a time period has passed, thus activating a delivery component to permit a certain amount of bait to be dropped through an opening to either the ground (surrounded by the securing leg/stake/extension components) or a plate or like structure that may, itself, include separate extension legs that limit access by reducing the space permitted for animals to enter in order to prevent larger animal (squirrel, raccoon, etc.) intrusion. In any event, such an alternative is still considered a delivery device that is automated for such a purpose and allows for long-term storage in a "fresh" state of multiple bait pellets (and the like) until deployment/delivery is permitted through a timed automatic access component.

The overall structure is further, whether the chambered type or bucket delivery type, self-contained with a secure cover that is configured to prevent moisture (whether rain or other source) from entering the storage compartments. Such a cover is removable through mechanical undertakings (unscrewing, detaching clips, and the like) that do require human involvement; however, such involvement is limited to an activity that is needed to provide new bait supplies after a certain time period (month, season, etc.) has passed. Furthermore, as it concerns the chambered or bucket types, the materials of the components therein storing such bait pellets (and the like) are preferably, though not necessarily, constructed in such a fashion as to prevent small rodent intrusion themselves. In other words, there remains a possibility that the attraction of such stored bait pellets (and the like) may cause such small rodents to seek further sustenance of the stored and not available for consumption bait (such as, for instance, if the supply of accessible bait has been consumed and the target population or members thereof seek more to ingest). To avoid the chances that the target rodents will act destructively in that sense, and thus damage the walls, etc., of the chambers, bucket, etc., the materials are of a type that cannot easily be chewed or scratched open, and/or are configured geometrically to reduce the chances of tooth and/or claw harm (such may be provided with slight curvatures, for example, rather than a total straight wall). In other words, the ability to prevent such further rodent intrusions at unwanted times is also provided within the overall device configuration, further allowing for reduced human monitoring and/or other involvement during long-term utilization of such a delivery protocol and system.

Additionally, if desired, the deployed lifetime of the bait/AI is maximized through the use of self-contained trays and/or bags that remain hermetically sealed until opened by chewing or scratching of the seal by small mammals. If necessary, an attractant that is coated onto the seal can provide a greater olfactory signature to attract the desired species, as well (such an attractant may be one that includes sugar-based substances, or other aromatic chemicals, such as, without limitation, marshmallow, peanut butter, syrup, and the like, types of coatings). Only the bait within the accessible bait chamber is exposed to the environment (or, if a sealed flexible flat bag, as shown below is utilized, such a bag is exposed for animals to open and remove bait therefrom), while bait in inaccessible chambers remains sealed until access is provided through the automated action of the overall device. The device also prevents larger animals from accessing the bait by physically restraining access to passages leading to the food source. As noted above, legs/stakes/extensions within the ground about the perimeter of the station prevent removal or disruption thereof by animals or other environmental sources (weather, wind, rain, etc.) and the composite coatings on the outside of the housing and also provide camouflage for such station devices, as well. Again, as above, such stakes also protect from invasive action from larger animals (such as preventing destruction via claws and teeth thereof). It should be noted that no attempt is made to discern between animal species of similar physical size. For instance, both field mice and voles may be able to access food within a single model of station.

Wide geographic distribution is addressed in both the low cost and modularity of the design. The simplest module is the lowest cost. These devices will probably represent the highest user count, but require minimal correctly timed refills in a single year. Monitoring capability in the next tier will appeal to a more technical user base, but still require maintenance.

An Active Oral Ingredient (AOI) includes any substance which is desired to be ingested by a target population. For example, a vaccine may be the AOI within a bait pellet to be consumed by a wild animal for immunization purposes. Likewise, it may be a lethal agent designed to kill the target population. An Active Contact Ingredient (ACI) includes any substance which is desired to be coated externally onto a target population. For example, an insecticide (such as, without limitation, permethrin, pyrethrin, deltamethrin, lambda-cyhalothrin, bifenthrin, esfenvalerate, fipronil, and the like) may be distributed on an animal using a contact applicator (such as wipes, or like structures, like plastic films, strings, and the like) in order to control parasites, such as fleas or ticks, within that population. Thus, in a broader sense, an Active Ingredient (AI) may be either an oral or contact ingredient and thus encompasses both ACI and AOI. An example is in the distribution of Lyme disease vaccine to field mice. For such an application, multiple generations of field mice are born each year and so require multiple timed applications of bait/AI pellets. Because field mice are so widely distributed geographically, large numbers of these stations can be required, so that the cost per station both in terms of material as well as installation must be minimized. A new series of Modular Time Release Application and Monitoring Systems have been developed and are encompassed herein that address the needs of different applications while maintaining a common hardware base. In this way, a single product line is applicable to many tiers of customers. The advantages of the core Time Release Application System is the ability to extend the lifetime of the bait/AI in the field (e.g., keep such ingredients separate and "fresh" for later consumption and safely partitioned so target animals will not compromise such stored bait and active ingredients therein and/or thereon) as well as to physically restrict access to the bait to a limited subset of animals (based on animal size, for instance). Additionally, advantages of these modules are that they allow precise timing of the availability of the bait/AI and, as noted above, measure the effectiveness of bait distribution within the target population. Although the Time Release Application System is intended for distribution of oral vaccine in wild small mammals such as field mice, the design would also have applications in domestic companion and food animal applications as well.

BRIEF DESCRIPTION OF THE DRAWINGS

FIG. 1 is a top perspective view of a flexible bait bag;
FIG. 1a is a side perspective view of a flexible bait bag;
FIG. 2 is a top perspective view of a rigid bit tray;
FIG. 2a is a side perspective view of a rigid bait tray;
FIG. 3 is an exploded top perspective view of a small modular bait station device;
FIG. 3a is a top perspective view of the small modular bait station device of FIG. 3 with a smaller exploded view of the electronic control component;
FIG. 3b is a bottom perspective view of the small modular bait station device of FIG. 3;
FIG. 4 is a different exploded view of a small modular bait station device of FIG. 3;
FIG. 5 is an exploded side perspective view of a direct-drive carousel assembly;
FIG. 5a is a cross-sectional side perspective view of the direct-drive carousel assembly of FIG. 5;
FIG. 6 is an exploded side perspective view of a large modular bait station device;
FIG. 6a is a top perspective view of the enclosed large modular bait station device of FIG. 6;
FIG. 6b is a bottom perspective view of the enclosed large modular bait device of FIG. 6;
FIG. 8 shows a top exploded view of a rotating bait station device;
FIG. 8a is a partial side cross-sectional view of the rotating bait station device of FIG. 8;
FIG. 8b is a side perspective view of the rotating bait station device of FIG. 8;
FIG. 9b is a side cross-sectional view of a different release direction of the device in FIG. 9a.

DETAILED DESCRIPTION OF THE DRAWINGS AND PREFERRED EMBODIMENTS

Figure 7:
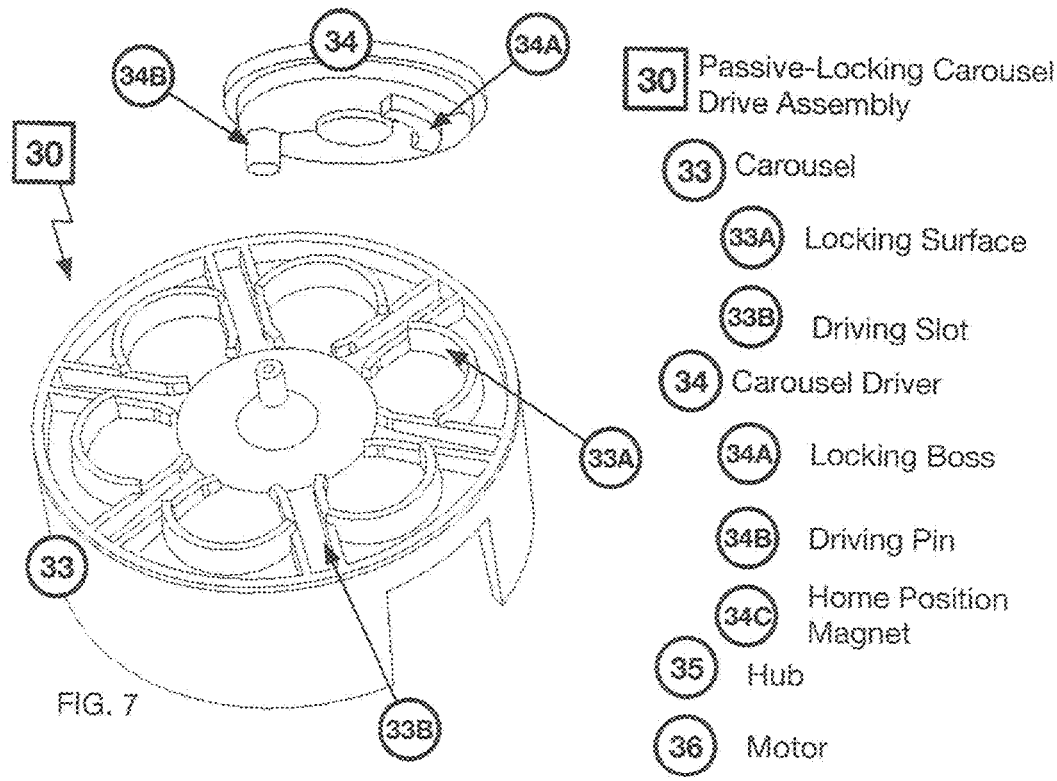
FIG. 7 is an exploded top perspective view of a passive-locking carousel drive assembly device.
Figure 7A:
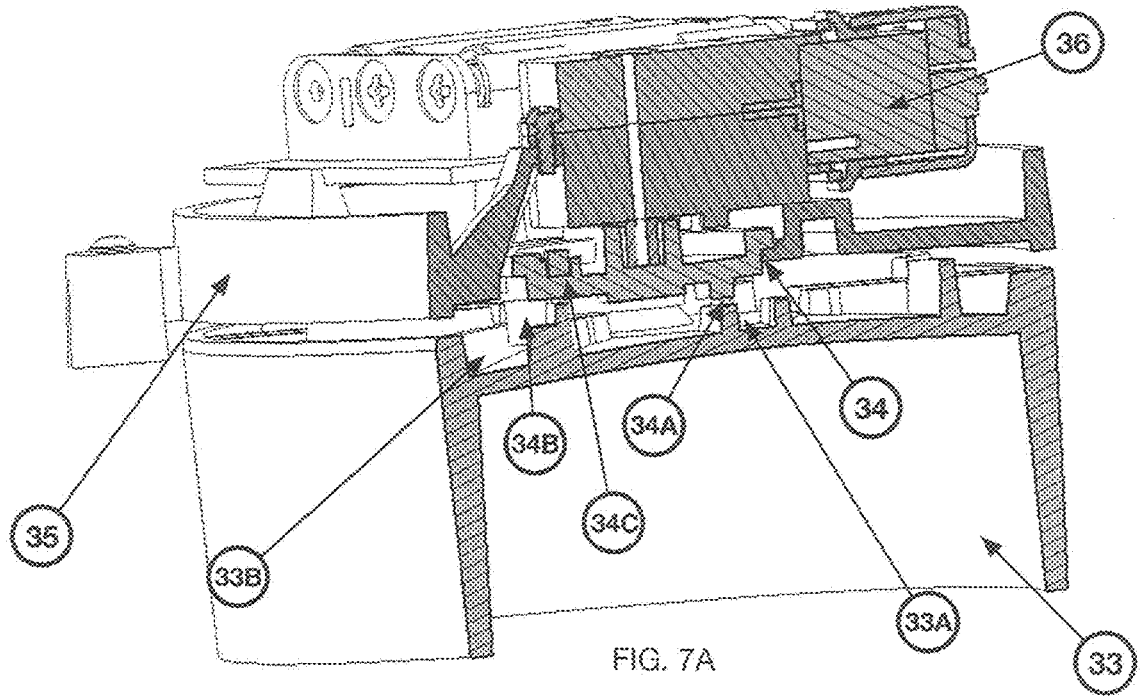
FIG. 7a is a partial side cross-sectional view of a passive-locking carousel drive assembly device.

All the features of this invention and its preferred embodiments will be described in full detail in connection with the following illustrative, but not limiting, drawings and examples. Thus, the drawings provided herein are not intended to limit the scope and breadth of the disclosed inventive device(s), but serve to provide a few different embodiments thereof. As well, for these drawings and descriptions, it is important to note that:

1. Numbers within squares denote different designs or major assemblies.
2. Numbers within circles are parts or components of assemblies.
3. Once a part or assembly has been identified by number, only the part name is repeated afterward.

Also, it is important to note that none of the bait station designs attempt a hermetic seal for the bait. To do so would require tolerances too high to be feasible in an outdoor and low cost design. Instead, bait is packaged into hermetically sealed containers with pre-measured quantities of bait that are either pre-loaded into bait stations prior to deployment or reloaded into a station in the field. These containers protect the bait from humidity, water, and insects until opened by the animal within the bait station. Two alternative designs for packaging the bait are presented in FIGS. 1, 1a, 2, and 2a.

In FIGS. 1 and 1a, a Flexible Bait Base (1), a top (2) and bottom (3) layer are attached about a dose of bait (3). Thermal or adhesive bonding is used to join the two layers. The top layer is thin enough to be mechanically torn or broken by target animals. Layers may be made of materials including Polyvinyl chloride (PVC) or low-density polyethylene (LDPE).

In FIGS. 2 and 2a, there is provided a Rigid Bait Tray (5) having a two-piece construction in which the tray housing (6) is made of a rigid, thin plastic such as high density polyethylene (HDPE) or a coated cardboard. The plastic seal (7) is a thin plastic layer (such as PVC or LDPE) which is thermally or adhesively attached.

Variations in either design include:
1. The addition of an attractant which has been wiped or sprayed onto the layers (2, 4, 6, 7) for increasing the rate at which target animals find and access the bait.
2. The addition of an integral pesticide into the layers (2, 4, 6, 7) for treating target animals for parasites such as ticks or fleas.
3. The addition of an integral repellant or marker into the layers (2, 4, 6, 7) against insects such as ants which may infest the bait station once the bait bags have been opened by the target animals.
4. The bottom layer of the flexible bag (4) may be made of a thicker material that remains intact during feeding so that the user may more easily clean and replenish the bait stations.

Flexible bait bags offer two potential advantages over the rigid design:
1. They can more easily fit the shape of the chambers within the bait station
2. Multiple bags can more easily be loaded into bait stations in order to vary the amount of bait available.

Rigid bait trays are potentially advantageous because they:
1. Retain their form after opening and feeding, leading to faster cleanup and safer handling for the user.
2. Could be used as a very low-cost distribution system that requires manual replacement of bait during inoculation cycles.

As it concerns, then, the implementation of an automated bait delivery device, these are provided in various configurations within FIGS. 3-9b. In these configurations, a top tier unit may include an automated carousel that selects which chambers within the bait station are accessible to target animals. The bait can thus be accessed according to a fully programmable switching sequence within such devices. For example, in FIGS. 3-8 (including sub-numbered figures, such as 3a, 3b, etc., in such a sequence) there are provided configurations for both a Direct-Drive Carousel (20) as well as a Passive-Locking Carousel (30). Depending on the volume and number of feedings required, the bait stations presented in this disclosure could operate autonomously for a full season while presenting fresh bait with every feeding cycle. In the case of a Lyme vaccination program (timed feedings in the spring and summer), a 6-chamber station, as one possible example, could be loaded and deployed at the beginning of the year and would not need maintenance until the annual vaccination program was complete. Different types of bait may be included in separate chambers, allowing distribution of different baits at different times of the year. With a single loading, for example, vaccine may be distributed in the early months of the summer while poison could be selected in the latter. Two alternatives to using a carousel are also presented. In the first, the bait itself is rotated into positions in front of an access door that an animal may use to gain access to the bait.

A rotating bait design (37) differs from, and may be less attractive versus a rotating access gate, because, as merely examples, such a rotating bait design would require the capacity to withstand a larger mass consisting of the turntable and bait. Additionally, the motor itself must be rotated, requiring a larger and more expensive motor as well as higher capacity power source. Furthermore, as the bait is eaten, the mass distribution of the turntable is not constant and will not stay in balance. Additionally, the larger perimeter of the turntable increases the possibility of drag and interference from either debris which may become trapped as the table rotates or from an imbalance in the mass load.

The base design for a modular bait station is shown as the Small Modular Bait Station (8). It may be upgraded with an electronics pack (17) to allow remote monitoring of activity within the bait station or upgraded with a carousel assembly (20) that allows unattended distribution of bait through up to three feeding cycles as well as remote monitoring. The Passive-Locking Modular Bait Station (27) offers similar functionality with up to 6 feedings, but is a larger design and more expensive to produce. Note that key components including the electronics pack (17) and both Carousel Drive Assemblies are the same in all of these bait station designs and are interchangeable.

The base Small Modular Bait Station consists of a Housing (12) which can be physically attached to the ground using stakes inserted through Stake Mount Points (15). The user loads the station using loose baits, bait bags (13), or bait trays. The size of the opening to the access ramp may be adjusted using a selection of removable inserts. For example, an insert with a small opening may be used for field mice while a larger opening could be installed to allow animals such as rats or squirrels into the bait chambers. The station may be used in either an indoor or outdoor setting.

To prevent bacterial and fungal growth, the inside of the housing and lid may be coated with anti-microbial or anti-fungal agents, or the entire parts formed from anti-microbial plastics such as Microban. For insect control, station parts may also be coated with an insecticide. The unit is weather-proofed and physically protected from large animals by attaching a lid (11). Both the housing and lid may be coated with a material such as concrete or aggregate which both camouflages the bait station with its surroundings and prevents chewing by animals.

The open access port in the lid is protected with an o-ring (10) and cap (9). Smaller target animal access the bait through the Access Ramp (14) and Bait Access Ports (16) that are molded into the Housing. The raised design of the Housing prevents surface water from entering the station while the lid prevents falling water and non-target animals from entering. Note that target animals may enter any of the bait chambers within the housing, meaning that each feeding must be manually loaded.

With the addition of the Electronics Pack (17), animal activity may be monitored. The PC Board (18) includes a processor, sensors, and wireless transceiver supporting WiFi, Cellular, or Bluetooth protocols. Power is through a battery and can be supplemented by solar panels integrated into the Cap (9) or Lid (11). The wireless transceiver allows remote detection of the number of animals currently within the station as well as animals who have entered over a given time period. The station may also collect and relay environmental data such as local GPS coordinates, ambient light, ambient acoustic signature, humidity, or temperature. Upon installation, the location of the bait station may be stored into the bait station memory using the mobile device of the installer and a mobile application.

The Mounting Cap (19) is a plastic part that physically isolates the electronics from the inside of the bait station and must be transparent to the optical frequency of the TOF sensor. The Mounting Cap also has recesses for rigidly mounting the PC Board within the station.

The bait station can be accessed directly using a computer, mobile device, or smart wrist watch. Data can be directly displayed to the user or can be downloaded to a remote server for storage, analysis, and display. Collected data may be useful for tracking animal activity and optimizing the physical placement of bait stations. Animal activity may also be used to estimate when bait needs replenishing.

Adding a Direct-Drive Carousel Drive assembly (20) allows the small modular bait station to automatically allow animals access to any one of three bait chambers. A Large Cap (21) now contains a larger battery pack (22) that is used to power a motor (22) that is controlled by a PC board. The PC board can be attached to the cap using snap fits, adhesives, or fasteners and spacers (24). The motor rotates a Carousel (26) with a single slot cut out of the side. This slot may be aligned with one of the three available Bait Access Ports to open the bait chamber and allow an animal to move from the Access Ramp into the bait chamber. The animal may then open a bait bag, tray or eat bait that has been packaged into the chamber loose. The Carousel can remove access to any of the bait chambers by rotating the slot to the solid back wall.

The PC Board contains the same sensing and communication capabilities as that of the basic Electronics Pack, with additional motor driving circuitry added. It is feasible that a single PC Board design can be used to support all of the different options presented. In addition, PC Boards may be stacked so that larger components, such as GPS or cellular receivers, can be mounted above the base PC Board and not interfere with the TOF sensors.

The Passive-Locking Modular Bait Station (27) is larger version of the Small Modular Bait Station that includes a difference carousel drive mechanism. The Passive-Locking Drive Assembly (30) addresses a weakness in the Direct Drive Carousel in which small animals may be able to move the carousel when power is not applied to the motor. The Passive-Locking Drive Assembly incorporates mechanical locking which maintains the position of the access gate even when power is not applied to the motor.

Contact between the Carousel Driver (34) and moldings at the top of the Carousel (33) along the curved Carousel Locking Surfaces (33a) and Driver Locking Boss (34a) provide passive locking when motor power is off. The Carousel is driven by a Driving Pin (34b) which rides within a Driving Slot (33b) so that each revolution of the motor indexes the carousel by a single chamber position. A magnetic (34c) or other type of sensor (optical, reed contact) provides feedback for detecting each revolution of the Carousel Driver. The hub (35) retains the Carousel Driver within a circular cut-out while the motor spindle (36) connects to a recess in the Carousel Driver. Although in this case the motor spindle directly engages the Geneva driver, arrangements of gears or pulleys may be used instead.

The Carousel is mounted into the hub by a screw fastened in the center of the Carousel spindle. The entire assembly (30) can then be mounted into bosses in the housing (29) and the lid then fastened (28). Animals access the bait chambers through an opening in the bottom of the housing and then have access to one of the chambers within the housing.

Alternatives to the drive mechanism presented include ball-detent or cantilever follower mechanisms, but weaknesses of these mechanisms are that they are resistive and not self locking and so require additional motor torque in order to index the carousel from chamber to chamber.

The Rotating Bait Table Station (37) variant is an alternative design in which the entire bait supply (as well as any animals happening to be feeding on the bait at the time) is rotated as the bait change sequence activates. This design is viewed as inferior due to the increased torque needed to drive the weight as well as its sensitivity to binding about the perimeter of the bait turntable.

The Rotating Bait Table Station consists of an Outer Housing (47), a Lid (38) and a Turntable (42). A Motor (41) is fitted into the central hub within the turntable and coupled to a Turntable Anchor (43) that remains fixed in the Outer Housing-molded Anchor Recess (43). Activation of the motor causes the motor to spin the entire turntable (the motor does not move relative to the Turntable) while the Turntable Anchor remains fixed. A Turntable Bearing (37) is molded into the Lid and keeps the Turntable centered as it spins. The housing has Stake Mount Points (48) for anchoring the bait station to the ground. A snap fit or fasteners attach the cover to the housing at its top. A rubber gasket may be added for additional sealing. To open and load bait, the Lid is removed and the Turntable, Motor, bait trays/bags, and anchor are removed as a unit. The bait may then be replaced or a pre-loaded assembly loaded back into the outer housing.

Common to both the large and small bait stations are hollow sections within the walls of the mold at the bottom of the housing and top of the Lid that can be filled using a material that is resistant to destruction by large and small animals. For example, a polymer mixed with steel wool fibers could be poured into the bottom recess of the housing. When cured, this material would provide protection from animals chewing into the station from the outside as well as animals chewing from one bait chamber to another.

Another common element to both the large and small bait stations is the provision for attachment of wipes for the application of Active Contact Ingredient (ACI) on animals accessing the bait station. In order to be most effective, these wipes would be attached to the inside of the Carousel using adhesives or mechanical means such as clips or rails. Attachment could either be horizontally along the top of the door of the Carousel or vertically along the sides of the Carousel door.

Figure 9:
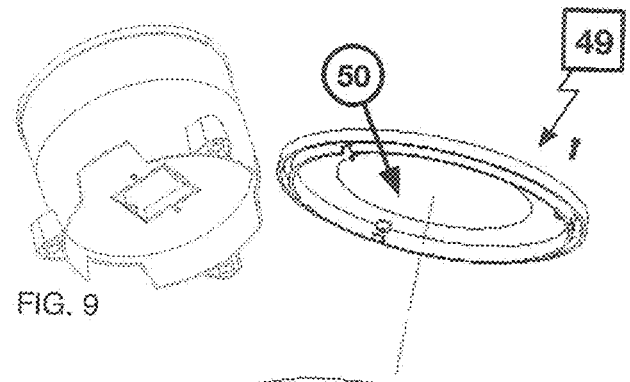
FIG. 9 is a bottom perspective view of a bucket/paddle hybrid feeder device.
Figure 9C:
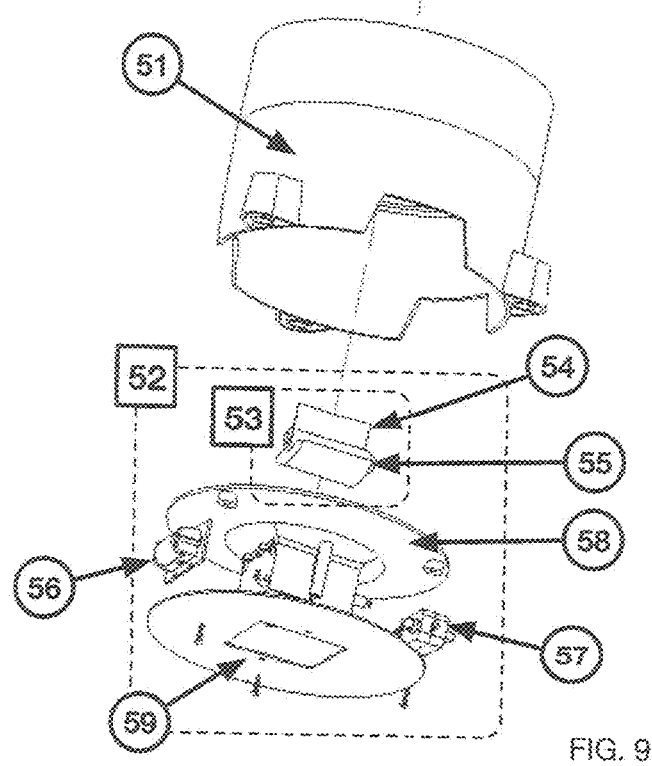
FIG. 9c is an exploded side perspective view of the feeder device of FIG. 9.
Figure 9A:
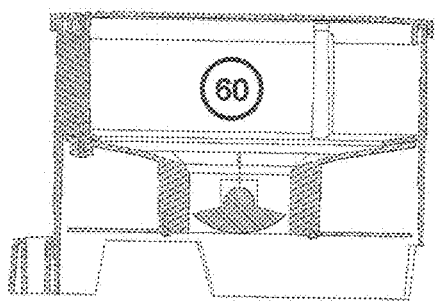
FIG. 9a is a side cross-sectional view of the feeder device of FIG. 9 with a directional component showing release in one direction.
Figure 9B:
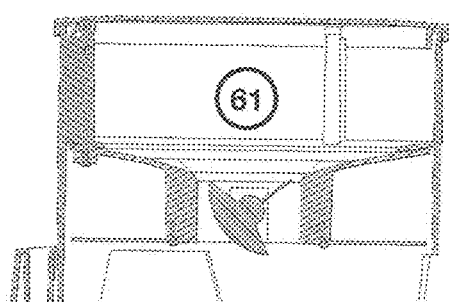

Additionally, the device may be provided in a raised relation to the ground with, as shown, for example, in FIGS. 6 and 9 (and the sub-numbered Figures thereof), extensions/legs/stakes for both contact and connection with the ground, but also as a means to regulate the size and type of animal having access to the bait. Thus, with a middle-configured access point, the raised device allows access to small target animals (field mice, rats, etc.), while the legs prevent other larger animals from entering the raised space and thus from entering the access point preventing bait access to such larger animals.

In FIGS. 9, 9a, 9b, and 9c, there is provided a bucket dispensing hybrid device. Such a Bucket/Paddle alternative configuration (49) is also presented in which bait is fed using a paddle/bucket mechanism from a single bait volume. In contrast to the carousel designs in which a fixed amount of zero or more baits may be presented according to a programmed schedule, the bucket/paddle design allows precisely controlled volumes of a single type of bait to be distributed to a target population. Likewise, there is provided a raised bucket with "stilts" configured to allow for small mammal (such as small rodents, like field mice, rats, and the like) access to the feeding station, preventing larger animals access. Such "stilts" may also be utilized to connect the device to the target ground in a secure fashion (such as through bolts screws, and the like).

As it thus concerns this bait station alternative, the Bucket/Paddle Hybrid feeder (49), again, a single, large bait volume is contained within the housing (51) which may be sealed with a lid (50). The Feeder Subassembly (52) is fitted into bosses molded inside of the Housing. The Feeder Chute (58) mounts the Spindle Subassembly (53) which consists of a rotating spindle with both a Flexible Blade (54) and Rigid Bucket (55). A Motor (57) fits into a recess in the spindle, and may rotate the spindle in a reciprocating fashion between closed (60) and open (61) positions. A PC Board (56) senses the position of the spindle by a magnet or other position sensor and controls the motor, tilting the bucket in order to dispense the volume of pellets caught between the flexible blade and the rigid bucket (60). Closing is accomplished by reversing the motor so that the rigid bucket seals the bottom of the chute to protect against animals accessing the bait. The Bucket/Paddle design is intended to balance the need for reliable pellet feeding without binding while still providing security against unwanted animal access to the bait volume within the housing. A method for estimating bait consumption and current bait levels is presented in FIG. 6. The TOF sensor arrays are attached to the top of the bait station lid and are pointed vertically down into the bait chamber.

In any of the structures provided within FIGS. 3-9, the materials utilized therein may be of any type that is sufficiently rigid to prevent intrusion by larger or smaller rodents when located singularly at a target location. As well, such a material must be able to withstand environmental conditions for long-term placement and utilization as described herein. Thus, as examples, such may be of HDPE, ABS, polycarbonate, polyacrylate, or any combinations thereof. An ABS-polycarbonate blend is potentially preferred. The materials may be provided in any color scheme and may, as alluded to above, include connection recesses for clips, screws, and the like for simplified attachment capabilities.

Figure 10:
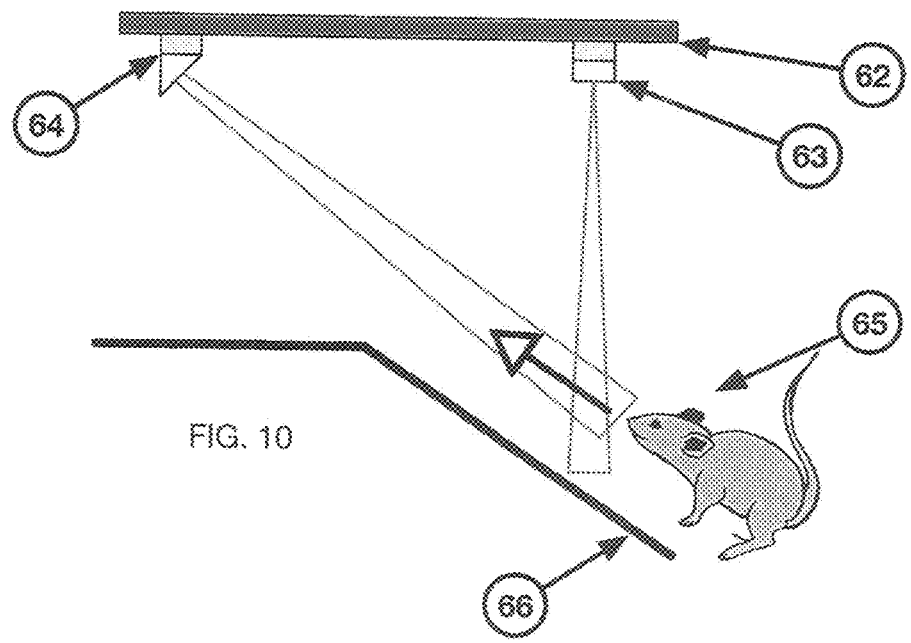
FIG. 10 is a side perspective view of a target animal sensor component.
Figure 10A:
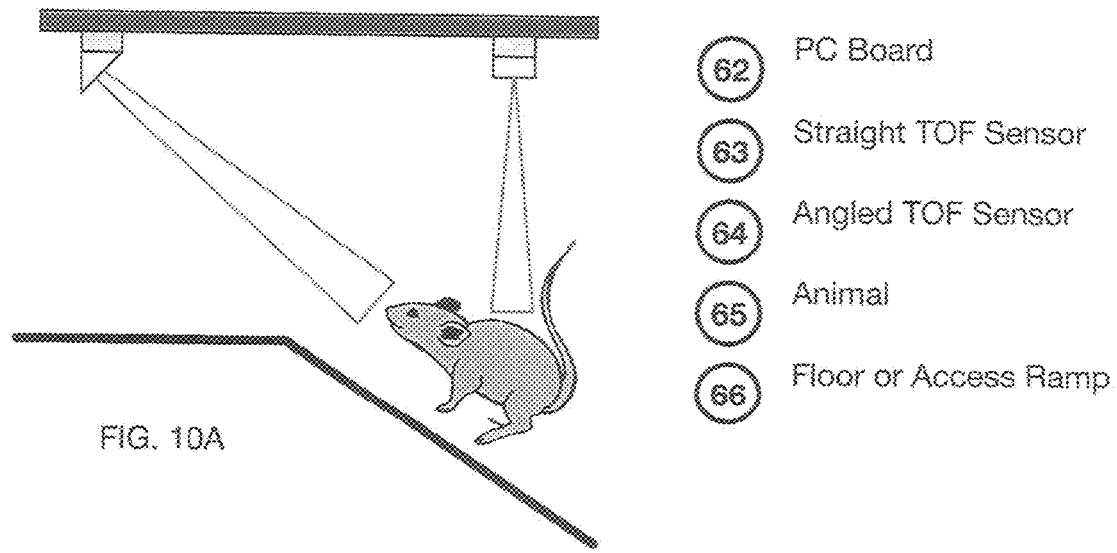
FIG. 10a is a side perspective view of the sensor component with a target animal detected.

FIGS. 10 and 10a show the utilization of a sensor to properly estimate animal activity, placed within the interior of the device. Such are able to detect the distance between the sensor and either the floor of the bait station or an animal walking along the floor. An angled sensor (64) that shines along the path of the ramp can detect the distance an animal (65) has moved along the ramp. This allows the detection of movement of animals into and out of the station. Additional sensors may be arranged perpendicular to the direction of motion (or to the page) to cover wider ramps.

A straight sensor (63) is only able detect when an animal enters or leaves the station (the case is ambiguous with only the sensor positioned above the ramp). The straight sensor can approximate the size of an animal within the station by detecting the minimum distance between the sensor and animal and subtracting it from the distance to the floor (66). The result corresponds to the vertical height of the animal. Multiple sensors arranged out of the plane of the paper may be used to cover wider ramps or areas. Animal activity is measured using a detection system consisting of one or more optical time-of-flight (TOF) proximity sensors. The TOF sensor measures the time it takes for a pulse of light to travel from the sensor, bounce off a target, and return to the sensor again. Animal activity may be detected in either of two methods:

1. If pointed down the Access Ramp, the distance between the TOF sensor and animal may be measured giving both animal direction (in or out of the station) as well as count. If pointed perpendicular to the PC Board, two or more sensors may detect the passing of an animal. Combining these sensor readings will determine both the direction and count of animals into the bait station.

Figure 11:
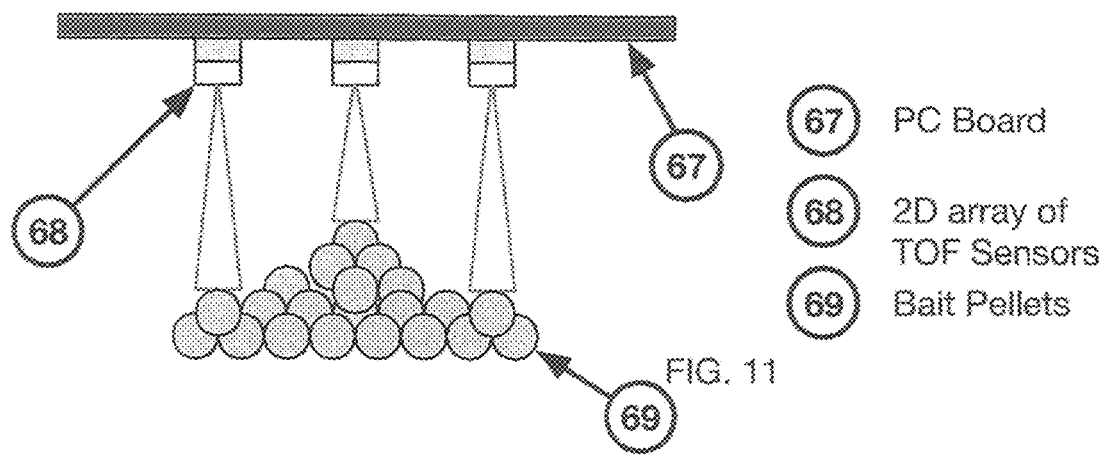
FIG. 11 is a side perspective view of a target bait detecting sensor.
Figure 11A:
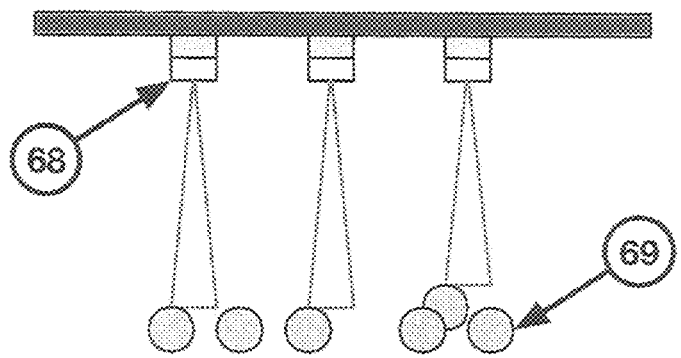
FIG. 11a is a side perspective view of the bait detecting sensor indicating a certain level has been removed.

In FIGS. 11 and 11*a*, there is also presented a means to estimate bait height, again placed within the interior of the device. This involves the utilization of a circuit board (67) of a 2D array of TOF sensors (68) placed in the lid of the bait station. Each sensor is able to detect the distance between it and the pile of bait pellets below (69). Upon filling the bait station with bait, a calibration sequence is performed in which the "empty" space (top) within the bait chamber is estimated by summing the distances between each TOF and the bait pile. As the pellets are eaten, new TOF distance measurements are made and summed across the array (bottom). The difference in "empty" volume is an estimate of the volume of bait pellets consumed between measurement intervals.

With these descriptions, there is provided a self-contained, timed access and delivery device for feeding targeted small animals at a discrete location that does not require in-person human involvement for monitoring, upkeep, operation, and/or deployment in order to direct consumption of necessary bait within a specific population.

It should be understood that various modifications within the scope of this invention can be made by one of ordinary skill in the art without departing from the spirit thereof. It is therefore wished that this invention be defined by the scope of the appended claims as broadly as the prior art will permit, and in view of the specification if need be.

What is claimed is:

1. An automated feed delivery bait station device, said device comprising:
    a housing having a top, bottom, and outer sides, wherein said top is a removable structure, said bottom includes a bottom access port for ingress and egress of at least one target animal within said bait station within a portion of said bottom of said housing further comprising a plurality of chambers of the same size and shape and evenly spaced from one another;
    a rotating carousel driver providing access to one of said plurality of chambers, wherein said carousel driver includes an opening aligning with said bottom access port which allows said target animal to enter said one of said plurality of chambers as said carousel driver revolves;
    a plurality of stakes extending from said bottom and said sides, wherein said stakes include connection means for staking said device into the ground for secure retention at such a location, wherein said stakes create a passageway therethrough and raise said housing such that said bottom access port does not contact said ground when said device is retained on said ground such that any ingress or egress of said target animal within said at least one compartment chamber of said bait device must be made underneath said housing bottom; and
    an electrical controller to activate movement associated with said bottom access port for the passage of feed therethrough when activated or the provision of an access point for said target animal to enter when activated, wherein said bottom access port is configured to permit ingress and egress of animals upon activation of said electrical controller, wherein said device further includes a carousel direct drive assembly comprising at least one motor, wherein said at least one motor is directly coupled to said rotating carousel driver for carousel rotation control by a PC board, and wherein said device further includes a passive-locking carousel drive in which the carousel driver position is mechanically locked when power is no longer applied to said motor.

2. The device of claim 1 wherein said plurality of chambers includes feed retained within bags which are comprised of: a flexible bottom plastic layer on which a flexible top layer is thermally or adhesively attached, and an active oral ingredient for distribution to said animals, said active oral ingredient selected from the group consisting of at least one vaccine, food, at least one therapeutic, and at least one poison, said plastic top layer optionally containing an attractant to target the interest of said at least one target animal.

3. The device of claim 2 wherein said bags include an attractant for said at least one target animal.

4. The device of claim 1 wherein said plurality of chambers includes feed retained within trays which are comprised of:
    a rigid plastic tray on which a plastic film is thermally or adhesively attached, and an active oral ingredient for distribution to said animals, said active oral ingredient selected from the group consisting of at least one vaccine, food, at least one therapeutic, and at least one poison, said plastic film optionally containing an attractant to target the interest of said at least one target animal.

5. The device of claim 1 wherein said bottom access port further includes a molded access ramp of a configuration to limit the physical size of said at least one target animal having access therein.

6. The device station of claim 1 in which said housing is made or coated with an anti-microbial, anti-fungal, or insecticide agent.

7. The device station of claim 1 in which said housing is constructed from a material that is resistant to chewing by animals.

8. The device of claim 1 further including an animal positioning sensor.

9. The device of claim 1 further including a loose bait indicator sensor integrated within said top of said housing.

* * * * *